(12) United States Patent
Pritchard et al.

(10) Patent No.: US 7,043,640 B2
(45) Date of Patent: May 9, 2006

(54) APPARATUS AND METHOD FOR PROTECTING A COMPUTER SYSTEM

(76) Inventors: James B. Pritchard, 660 Meandering Way, Fairview, TX (US) 75069; Clyde R. Calcote, 1009 Serenade La., Richardson, TX (US) 75081

( * ) Notice: Subject to any disclaimer, the term of this patent is extended or adjusted under 35 U.S.C. 154(b) by 955 days.

(21) Appl. No.: 09/783,049

(22) Filed: Feb. 14, 2001

(65) Prior Publication Data

US 2002/0147930 A1    Oct. 10, 2002

(51) Int. Cl.
*H04L 9/00* (2006.01)

(52) U.S. Cl. ............... 713/184; 713/170; 713/183; 726/28; 726/29

(58) Field of Classification Search ............ 713/202, 713/183, 182, 184, 185; 380/52
See application file for complete search history.

(56) References Cited

U.S. PATENT DOCUMENTS

| | | | |
|---|---|---|---|
| 4,197,524 A | | 4/1980 | Salem |
| 4,455,588 A | | 6/1984 | Mochida et al. |
| 4,621,334 A | | 11/1986 | Garcia |
| 4,805,222 A | * | 2/1989 | Young et al. ............... 382/115 |
| 5,241,594 A | * | 8/1993 | Kung ........................ 713/151 |

* cited by examiner

*Primary Examiner*—Kambiz Zand
(74) *Attorney, Agent, or Firm*—Steven W. Smith; Sidney L. Weatherford

(57) ABSTRACT

There is disclosed an apparatus and method for protecting a computer system by providing an improved password to prevent unauthorized access to the computer system. The apparatus of the present invention generally comprises a password controller capable of comparing a received password attempt with a stored password. The stored password of the present invention comprises a time envelope that comprises at least one password segment comprising: 1) an entry event; 2) a predetermined time interval following the entry event; and 3) a terminating signal to mark the end of the password segment. Access to the computer system is authorized when password segments of a password attempt match the corresponding password segments of the stored password. The stored password of the present invention generally comprises groups of computer readable characters separated by time intervals of variable length. A time delay is added to each response to a password attempt in order to conceal the length of the time intervals within the stored password.

7 Claims, 8 Drawing Sheets

APPARATUS AND METHOD FOR PROTECTING A COMPUTER SYSTEM

TECHNICAL FIELD OF THE INVENTION

The present invention is directed, in general, to an apparatus and method for protecting a computer system and, more particularly, to an apparatus and method for providing an improved password to protect a computer system from unauthorized access.

BACKGROUND OF THE INVENTION

Password violations are a major cause of security breaches in computer systems. In particular, poorly chosen or inadequate passwords are the major cause of computer security breaches. Generally, a password for accessing network and personal computers is chosen because the password is easy to remember. However, one major reason for password system failures is that users are liable to forget the password. This fact encourages a user to write down the password or select a password that will be easy to remember. Simple passwords that are easy to remember are also easy to figure out. When a user writes down the password, the password may be seen by others. This increases the potential for compromising the security of a password protected system.

Companies that develop software have procedures that may also compromise passwords. Because purchasers and users of a particular software application tend to forget passwords, software companies provide a "backdoor" in the software application. The term "backdoor" refers to a method for bypassing a specific password entry into the software. The purpose of this customer service is to allow the software company to access its software application without a password. However, this "backdoor" also exposes the computer system to unauthorized entry.

A network operating system usually has a master password that enables a network manager to open any file on the network. This presents a weakness on network systems. When a network manager leaves a company under less than happy circumstances, the former network manager may insert his or her own backdoor entry into the system for later access. The existence of backdoors is widely known in the computer industry. The search for possible backdoors is a primary line of attack against computer security.

An additional problem with "password secured" computer systems is the already large and growing threat from "hackers." Originally, the term "hacker" meant a computer programmer with little or no formal training. The current popular definition of a hacker refers to individuals who gain unauthorized access to computer systems for the purpose of stealing and/or corrupting data. Hackers are known for breaking into supposedly secure computer systems and playing havoc with web sites, credit card accounts, internal databases, etc. Many of the Internet or online sites that have been hacked were once thought to have been relatively secure.

Among many tools that hackers use is a so-called "wardialing" program that operates online and automatically scans thousands of telephone numbers to identify systems that are available for hacking. This includes Digital Subscriber Line (DSL) systems or cable online systems, which are particularly vulnerable because of their continuous connection to the Internet. After finding potential targets, the hacker will likely bring into play many software tools to break into the target system.

Hacker software tools also include programs that try many combinations of numbers and letters over a set period of time in an attempt to compromise a password protected system. A very effective approach is a "dictionary attack" application. On some operating systems, as each letter or number is presented by the hacker, the letter or number is confirmed by the system as right or wrong. This serial confirmation sequence makes the dictionary attack program a strong hacker tool. However, on other operating systems, the password must be completely entered correctly before confirmation is supplied by the system. This may slow down the password discovery process but, with time, the hacker's computer can eventually present a correct password to the target computer system.

Therefore, a need exists in the art for an apparatus and method to provide password protection for a computer system. In particular, there is a need in the art for an apparatus and method that is capable of providing virtually hacker proof protection for an online computer system.

SUMMARY OF THE INVENTION

To address the above deficiencies of the prior art, it is a primary object of the present invention to provide an improved password that will prevent unauthorized access to a computer system. There is disclosed an apparatus and method to prevent unauthorized access to a computer system. According to an advantageous embodiment of the present invention, the password apparatus comprises a controller for operating a password program to compare a received password attempt to a stored password. The structure of the stored password comprises a time envelope that comprises at least one password segment that comprises: 1) an entry event; 2) a predetermined time interval; and 3) a terminating signal to mark the end of the password segment.

According to one embodiment of the present invention, a time envelope is included as an element of the password. The time envelope is measured from the time of an initial entry event (or signal) to the time that a terminating signal is detected.

According to another embodiment of the present invention, the password program compares a password attempt with a stored password.

According to still another embodiment of the present invention, an entry event, which is included in a password segment, comprises a predetermined combination of computer readable entry signals. The entry signals may comprise a character, a symbol, or a number, or any combination of characters, symbols, and numbers.

According to yet another embodiment of the present invention, the password program is capable of adding a time delay of variable duration to the stored password prior to sending a rejection or an acceptance of a password attempt.

According to another embodiment of the present invention, the format of the stored password comprises entry events and associated time intervals. The length of a time interval is determined by subtracting the length of an entry event from the total time of a password segment.

According to an additional embodiment of the present invention, the stored password may contain a plurality of password segments. The total time of all the password segments in a password attempt must match the total time of all password segments in the stored password, within a predetermined deviation.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
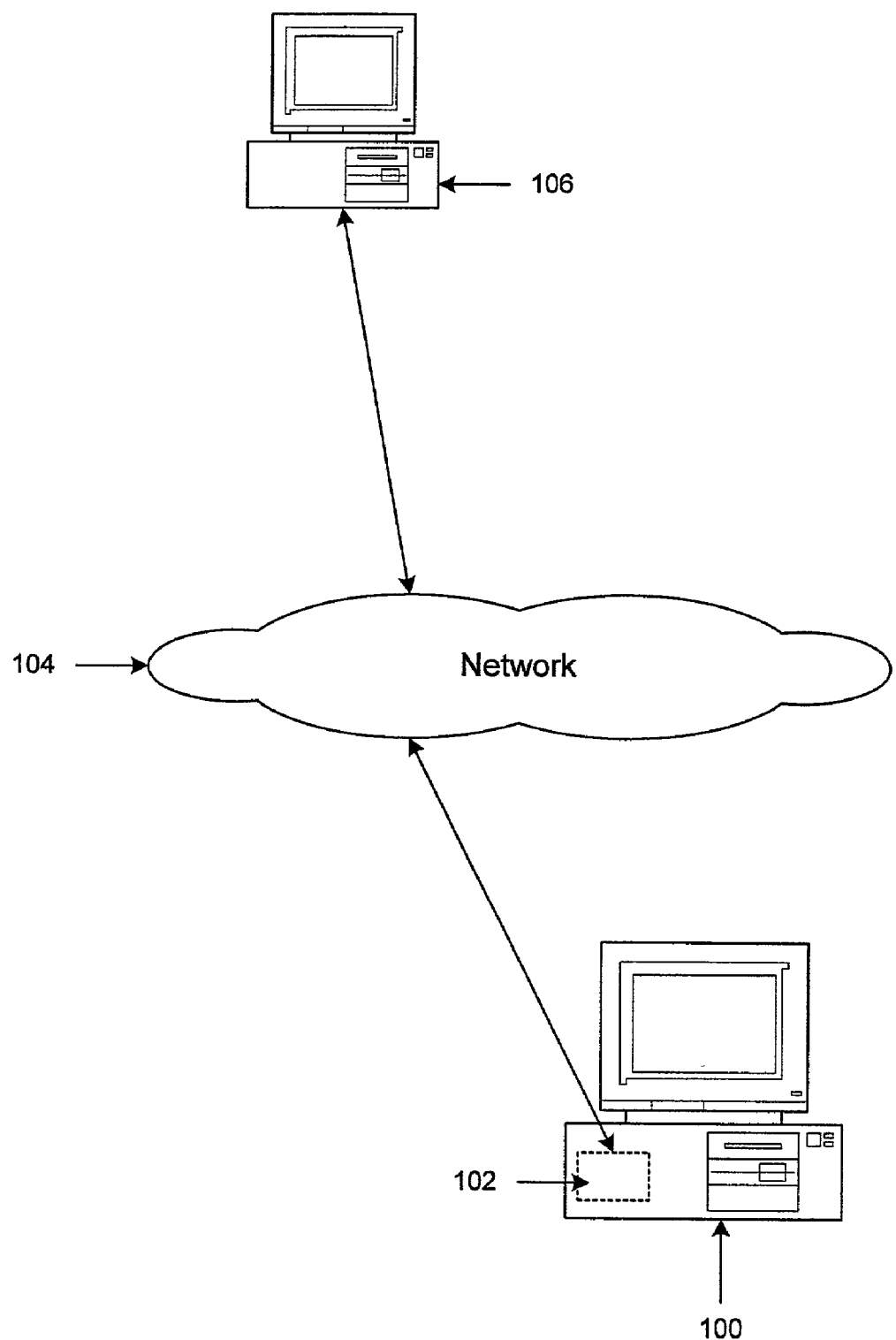
FIG. 1 depicts a high-level block diagram of an exemplary computer network system.
Figure 2A:
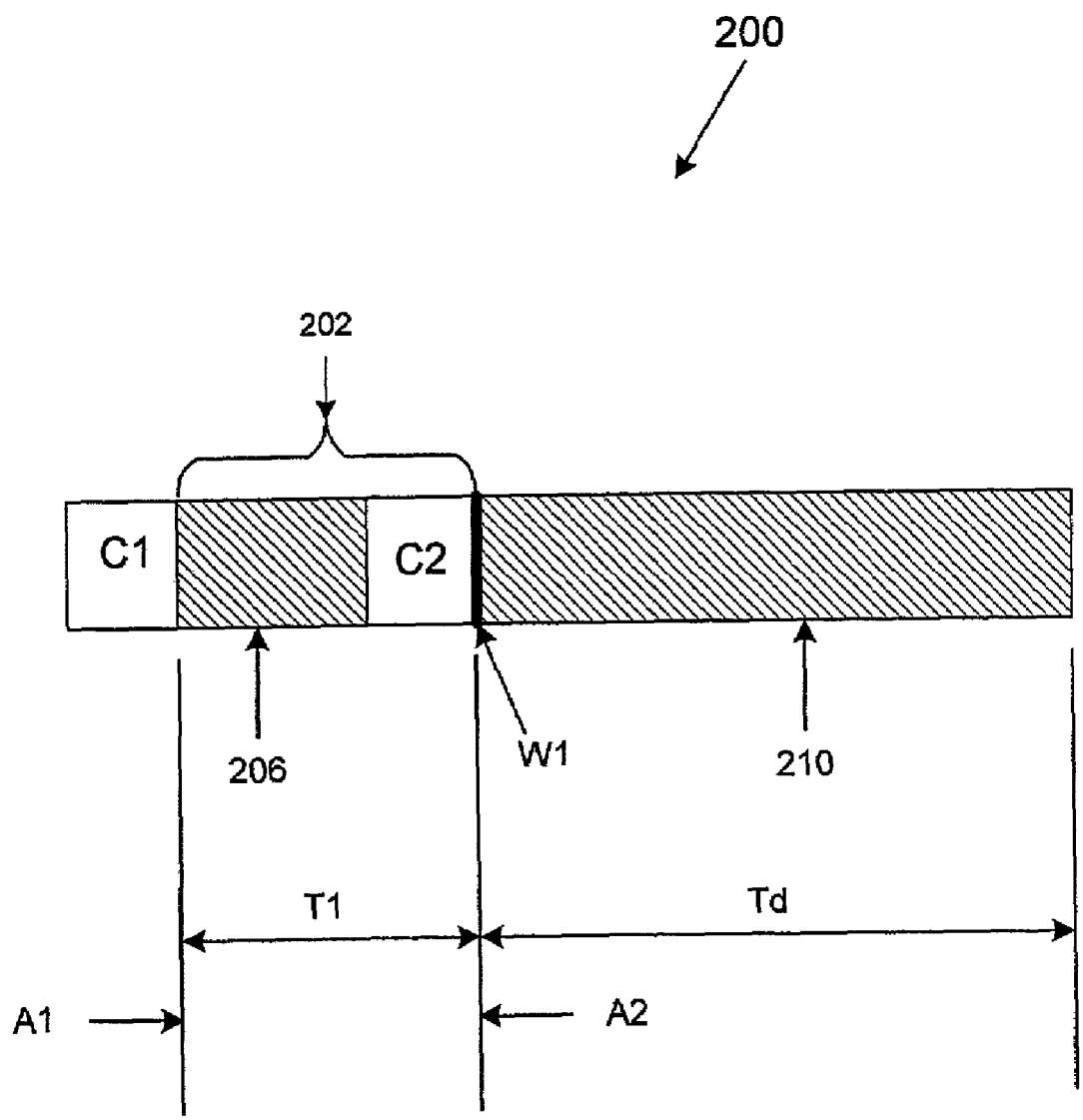
FIGS. 2A–E illustrate exemplary embodiments of the present invention in accordance with the principles of the present invention.
Figure 2B:
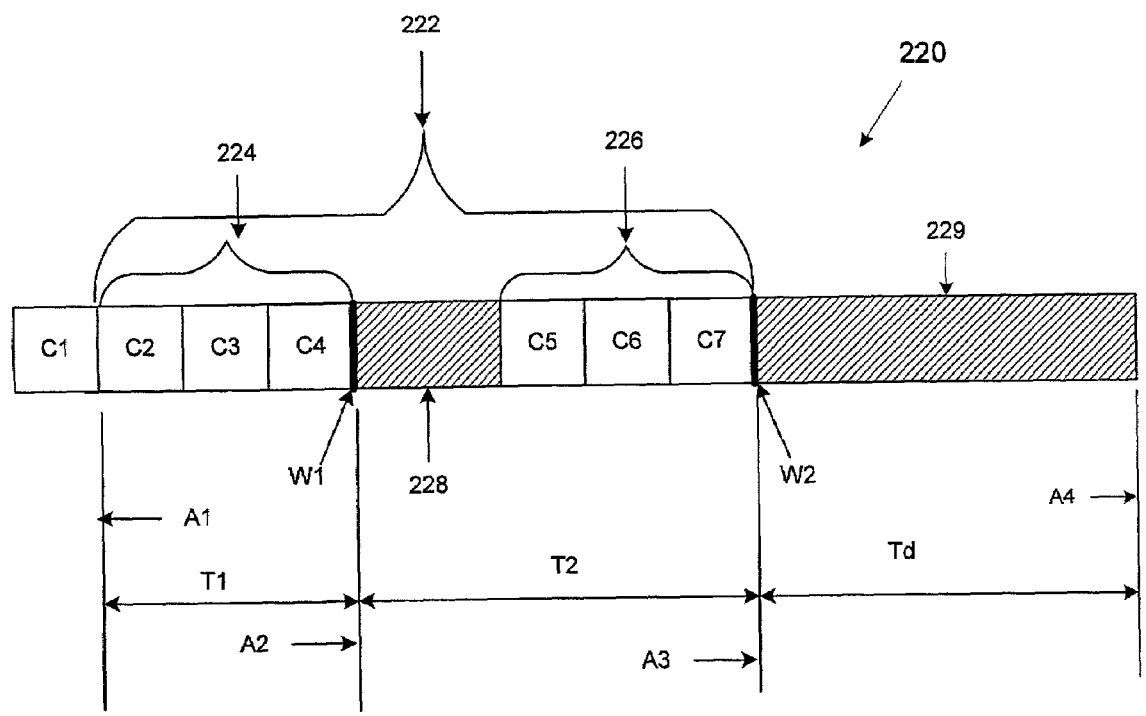
Figure 2C:
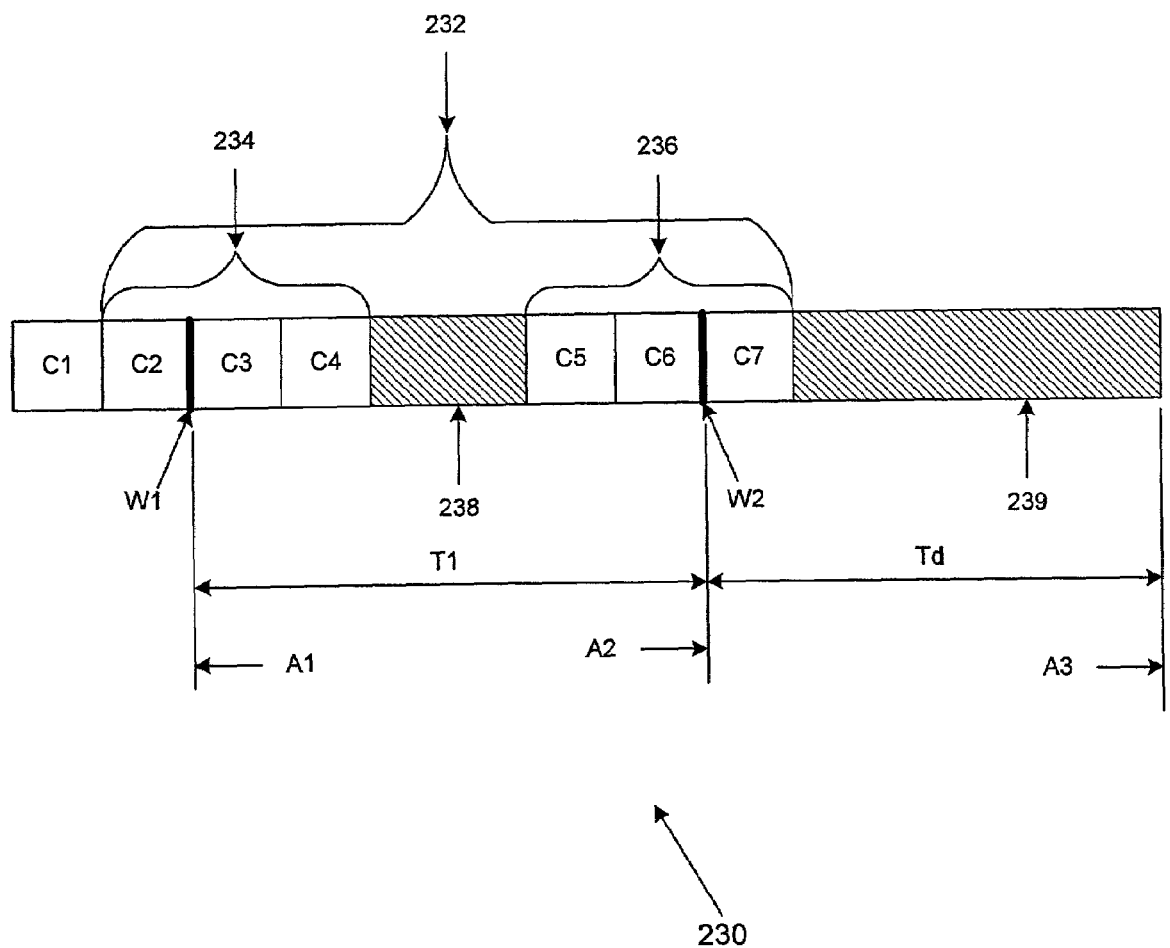
Figure 2D:
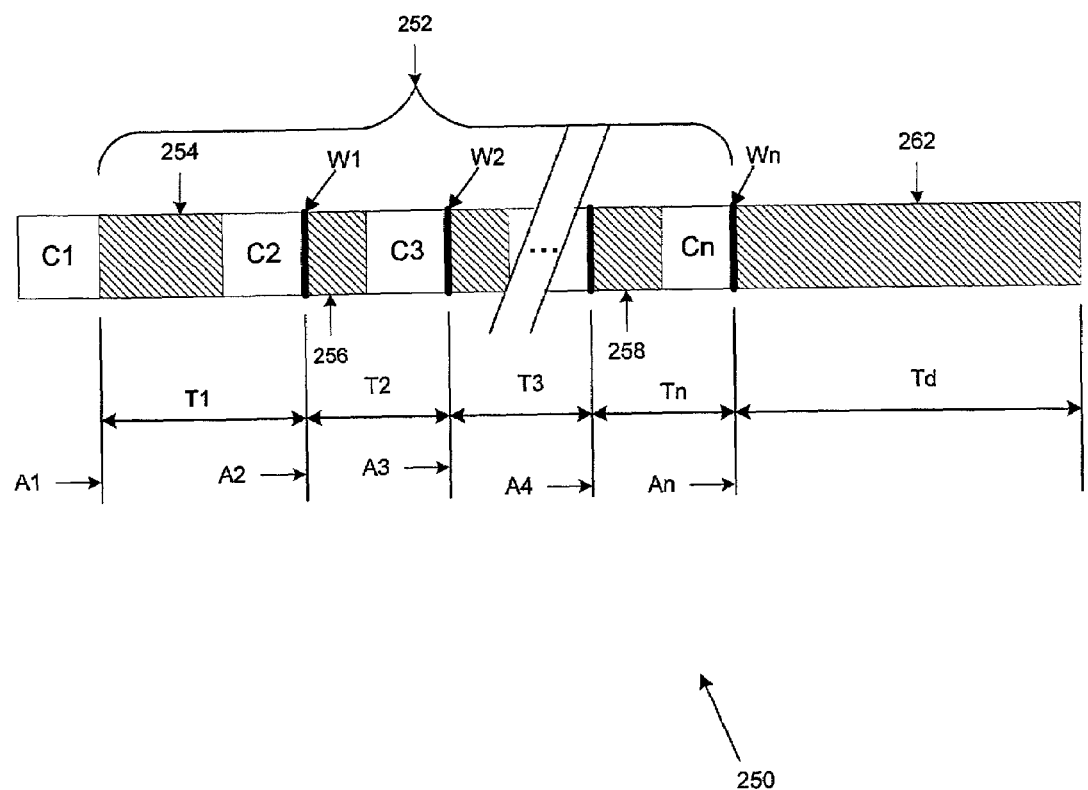
Figure 2E:
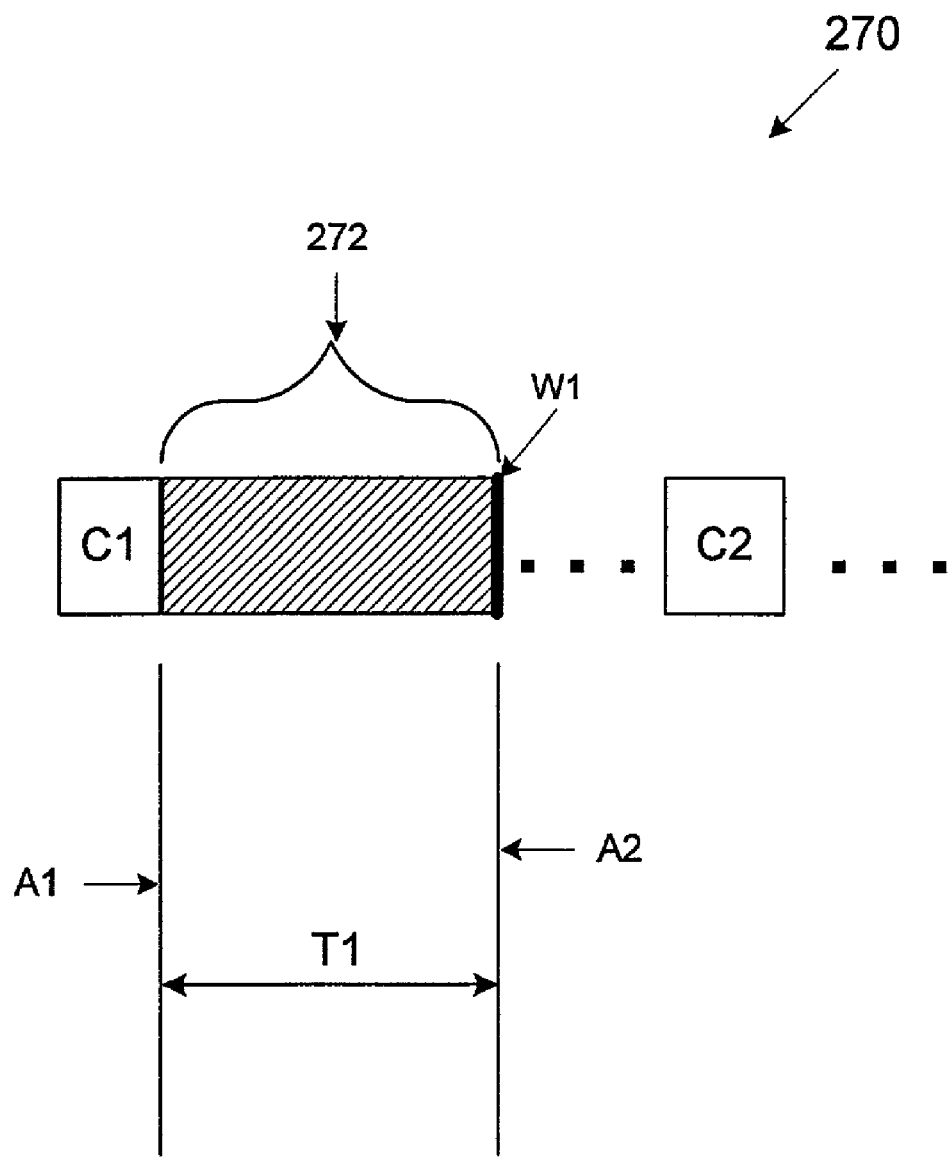
Figure 3:
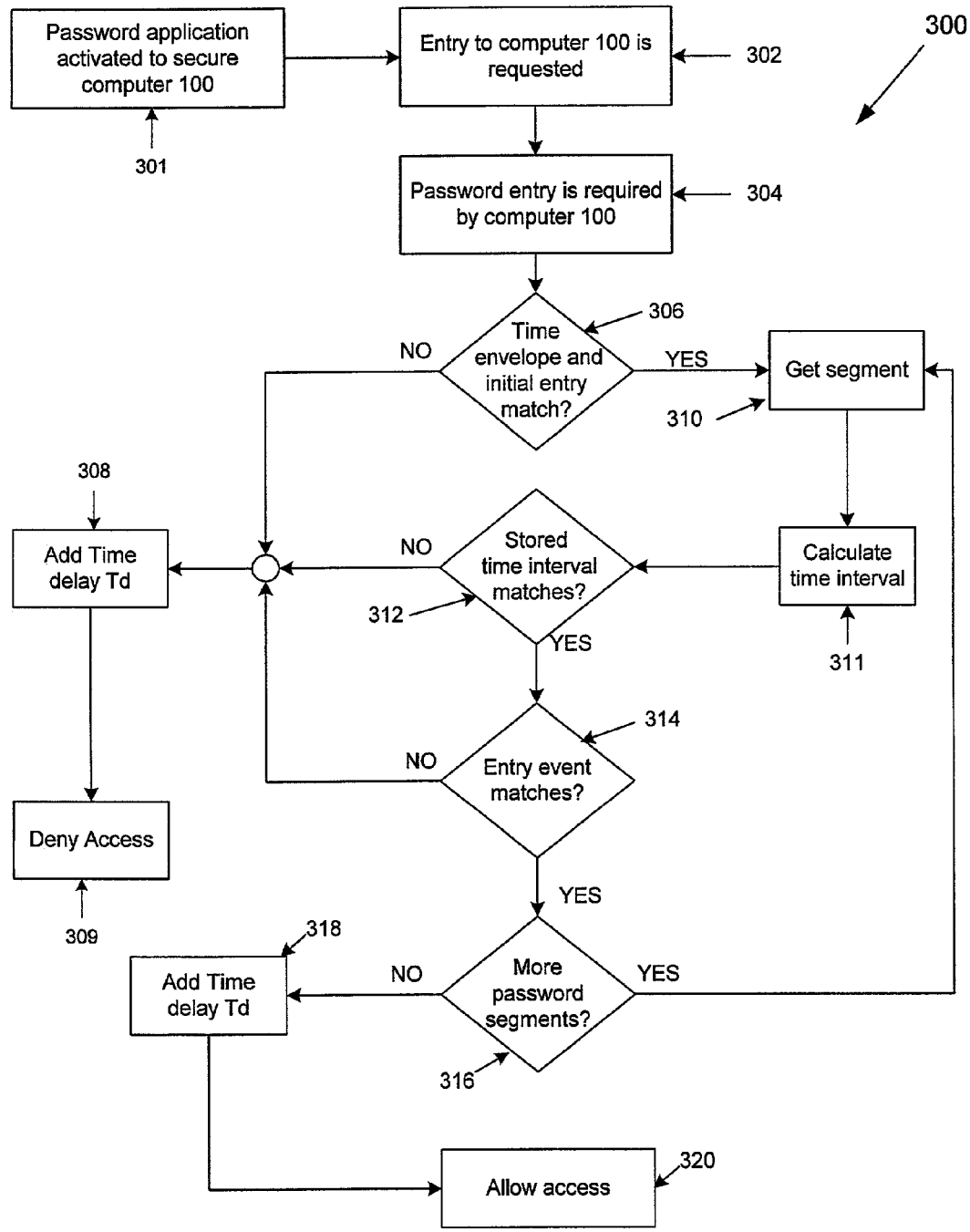
FIG. 3 depicts a high-level flow diagram illustrating the operation of an exemplary computer password protection system according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged password protection system for a computer system.

FIG. 1 depicts a high-level block diagram of an exemplary computer network system. Computer 100 contains a password protection system of the present invention. The present invention comprises executable computer program instructions in a computer program that may be installed in computer 100 to monitor incoming signals and data from computer network 104. A detection portion of the executable program instructions monitors and compares incoming signals with a stored series of predetermined signals. The detection portion of the executable program instructions may comprise a "terminate and stay resident" (TSR) program. The predetermined signals may represent letters, numbers, sounds, or any signals that are readable by a computer. A password builder portion of the executable computer program generates one or more "entry events." Each entry event is made up of one or more "entry signals." Two entry events may be separated by a predetermined time interval. A series of entry events separated by predetermined time intervals comprise a password of the present invention. The password is stored in a memory accessible by computer 100.

Communication between computer 100 and network 104 is accomplished utilizing network interface device (NID) 102. NID 102 can be a LAN connection, a WAN connection, cable modem, digital subscriber line (DSL) modem, wireline modem or any other means of connecting computer 100 with a network. Network 104 can be a LAN, a WAN, the Internet or any other network that is capable of sending/transmitting data between computers, telephones or any other electronic devices (smart houses, appliances, etc.) capable of transmitting and receiving data.

Computer 106 is connected to network 104 and may communicate with computer 100. Computer 106 may attempt to access data, files or programs that are resident on computer 100. Because computer 100 is protected by a password of the present invention, computer 106 must present a password attempt that is recognized by the TSR portion of the computer program that monitors NID 102 in order to gain access to computer 100. If a password attempt is presented by computer 106 and the TSR portion of the computer program residing in computer 100 rejects the password attempt, computer 106 is unable to communicate with or access computer 100. Only when computer 106 presents a password attempt that matches the stored password is access to computer 100 granted.

Figure 1A:
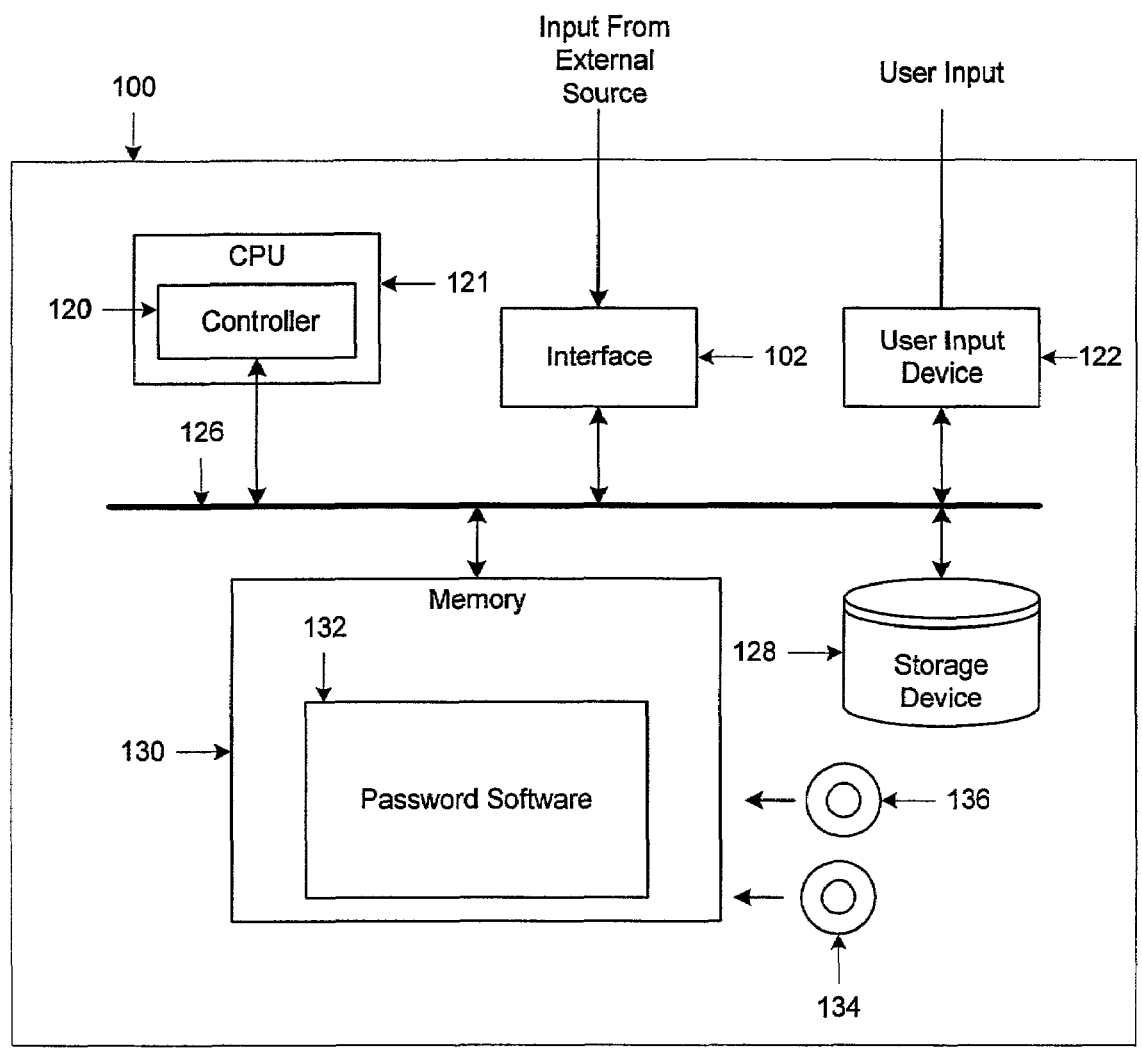
FIG. 1A depicts a high-level block diagram of an exemplary computer system in which an advantageous embodiment of the present invention is implemented.

FIG. 1A illustrates a high-level block diagram of computer 100. Computer 100 generally comprises central processing unit (CPU) 121, memory 130, storage device 128, external interface 102, and user input device 122. These elements of computer 100 are connected by and communicate through computer bus 126.

Computer 100 comprises memory 130 that contains password software 132 of the present invention. Controller 120 is depicted in this particular embodiment as contained within CPU 121. Controller 120 and password software 132 together comprise a password controller that is capable of carrying out the present invention. An operating system program (not shown) coordinates the operation of password software 132 with the operating system of controller 120.

Password software 132, under control of controller 120, identifies password attempts and individual password segments as they are received via interface 102. Interface 102 may comprise a network device, a modem, or any external connection device. A password attempt may also be received via user input device 122. User input device 122 may comprise a keyboard, a mouse, a floppy disk, etc. Password software 132 can detect a password attempt received by computer 100 from devices that provide local input and from network or modem type devices that provide remote input.

A password attempt may be detected by receiving an entry event that signals a password attempt is to follow.

Controller 120 is capable of receiving user instructions from user input device 122. In response to user instructions, controller 120 is capable of instructing password software 132 to create elements of a new password and to modify elements of a previously stored password, where the password elements may comprise characters, symbols, numbers and time intervals. Controller 120 operates a portion of password software 132 to detect a password attempt from an external source. An external source includes, without limitation, a network connection, a modem connection, and any input device connected to computer 100 such as a keyboard, a mouse, a hard disk drive, etc. Controller 120 also operates password software 132 for comparing password attempts with a stored password (not shown in FIG. 1A).

Password software 132 is stored in memory 130 which may comprise random access memory (RAM) or a combination of random access memory (RAM) and read only memory (ROM). Memory 130 may comprise a non-volatile random access memory (RAM), such as flash memory. In an alternate advantageous embodiment of the present invention, password software 132 may be stored on a mass storage device, such as hard disk 128. In another alternate advantageous embodiment of the present invention, password software 132 may be stored on an attached peripheral drive or a removable disk drive (whether embedded or attached) of the type that reads a Read/Write DVD or a re-writable CD-ROM. These types of disk drives are illustrated schematically in FIG. 1A by Read/Write DVD 134 and re-writable CD-ROM 136.

FIGS. 2A–2E illustrate exemplary embodiments of the password of the present invention. FIG. 2A depicts a high-level time-line for password 200 containing password segment 202 that comprises time interval 206 and entry event C2. A password comparison sequence is initiated when the TSR portion of the computer program recognizes an initial entry event/signal C1. The TSR portion of the computer program begins comparison of the incoming signals with the signals of the stored password. Entry event C1 acts as a start/sync character for the password detection algorithm. An entry event and an entry signal may be the same. However, there may be a plurality of entry signals that are required to produce a character (or characters) or a symbol (or symbols), etc., that make up a single entry event.

Initial entry event C1 serves to trigger an interval timer (not shown), controlled by password software 132, by causing the interval timer to set (or reset) to zero at time A1. In this embodiment, the timer is set upon detection of the trailing edge of entry event C1. After being set to zero, the interval timer starts calculating time intervals (in increments that may range from nanoseconds to days) for the incoming password attempt for comparison with the time intervals that are predetermined and incorporated into the stored password.

After initial entry event C1 is recognized by password software 132, a predetermined time interval 206 must occur. Time interval 206 is a period during which there are no entry events or entry signals. Should a character or entry signal be detected during time interval 206, password software 132 recognizes the "out of place" entry event as an invalid password attempt. In response to an invalid password attempt, time delay 210 is added to the actual time required to read the presented password and then returned as "access denied." Time delay 210 is an arbitrary period of time that is generated and added by password software 132 to prevent revealing any timing parameters of the stored password.

Predetermined time interval 206 follows initial entry event C1. Time T1 (segment time) is measured from the trailing edge of initial entry event C1 and represents the total amount of time of time interval 206 and entry event C2. Predetermined time interval 206 can be a user specified amount of time or a random time interval generated by the password generating portion (not shown) of password software 132. The time required for entry event C2 (and all subsequent entry events) is calculated by using the serial bit transfer rate (baud rate) of the actual incoming signal. The length of predetermined time interval 206 is calculated by subtracting the time of entry event C2 from the segment time T1. The second entry event C2, is compared to an incoming entry event (one or more computer readable signals) received by computer 100. Alternatively, time T1 may be calculated by starting the interval timer at a signal within a first group of signals that form an entry event and the ending within a second group of signals that form a subsequent entry event.

In all computer systems, there exists an inherent delay in the computer's processing time which must also be taken into account when measuring time intervals. In the apparatus and method of the present invention, a plus or minus percentage deviation in baud rate and processing time is addressed by providing deviation window W1. Deviation window W1 is a deviation period that accommodates the additional times required for computer 100 to recognize and read a character or group of characters. The period of deviation window W1 is based on the baud rate of the incoming signals. Generally, a deviation window is plus or minus a percentage of the preceding time interval (see Table 1). Computer 100 recognizes entry event C2 during deviation window W1 and establishes time T1. Time T1 includes a password segment's predetermined time interval 206 and the character recognition time associated with entry event C2. Time T1 must end within deviation window W1. Time interval 206, entry event C1, and entry event C2 must match the password stored in computer 100 in order to be a valid password attempt.

If time T1 does not end within deviation window W1, then password software 132 detects the error and rejects the password attempt as invalid. Arbitrary time delay Td is added before sending the rejection of the password attempt to computer 106 that is requesting access. If time T1 ends within deviation window W1, the interval timer (not shown) that provides timing for the algorithm of the stored password is stopped, reset to zero, and then re-started for arbitrary time delay Td. A plurality of interval timers may be used to monitor time T1, time interval 206 and arbitrary time delay Td. At the conclusion of arbitrary time delay Td, if a correct password attempt has been presented, a successful password entry is acknowledged and access is granted.

Each entry event comprises of one or more predetermined entry signals that represent one or more numbers, letters, sounds, symbols, characters, etc., in any combination in the password structure. Those skilled in the art will appreciate that an entry event can, and usually does, comprise a plurality of groups of signals that represent a password.

FIG. 2B illustrates a time-line of a password 220 according to another embodiment of the present invention. Password 220 comprises time envelope 222 (total time of the entire password 220) following an initial entry event C1, entry event 224 (comprising entry event C2, entry event C3, entry event C4, zero time interval and deviation window W1), time interval 228 and entry event 226 (comprising entry event C5, entry event C6, time interval 228, terminating entry signal C7 and deviation window W2). Each segment (at least one entry event) of the password must occur within password envelope 222. An arbitrary time delay, Td, that is equal to time segment 229 is then applied to the end of the password envelope 222 before sending an acceptance or a rejection of the presented password attempt to computer 106.

FIG. 2C illustrates a time-line of another password 230 according to another embodiment of the present invention. Password 230 comprises time envelope 232 following an initial entry event C1, entry event 234, time interval 238, entry event 236 and deviation windows, W1 and W2. Entry event 234 comprises entry signals C2, C3, and C4. Entry event 236 comprises entry signals C5, C6, and C7. In this embodiment, entry signal C1 is the initiating entry signal that triggers password software 132 to began comparing the incoming signals of a password attempt to the stored password. The total password 230, in this instance, comprises entry signals C2, C3, and C4, time interval 238, and entry signals C5, C6, and C7.

However, as predetermined by the user, interval timing begins at A1 in deviation window W1 after detecting the second entry signal at A1, continues through time interval 238, and ends in deviation window W2 upon detecting entry signal C6 at time A2. Then entry signal C7 is received. The password attempt is invalid if entry signal C7 is not detected. Password acceptance is delayed by an arbitrary amount of time Td. Time Td is the sum of the time of entry signal C7 and arbitrary time segment 239. Computer 100 then sends an "access denied" signal or an "access allowed" signal to computer 106 that is presenting the password attempt. The time Td is not a part of the presented password attempt and is not a part of the stored password. It is an element that is generated by password software 132 to mask the length of time envelope 232 so that computer 106 can not determine the length of the stored password.

FIG. 2D illustrates a time-line of a password 250 that utilizes a plurality of password segments. Password 250 comprises time envelope 252 and entry signals C2, C3, . . . , and Cn, time intervals 254, 256, . . . , and 258, and deviation windows W1, W2, . . . , and Wn. Time envelope 252 is calculated from the trailing edge of initializing entry signal C1 to the trailing edge of entry signal Cn. Initializing entry signal C1 is detected by password software 132. The interval timer is then reset and begins timing time interval T1 at time A1. Time interval 254 is determined by subtracting the time of entry signal C2 time from time T1. Time T1 is the sum of time interval 254 and the time of entry signal C2 with a deviation factor of plus or minus a predetermined percentage of the total time. Deviation window W1 is typically a ten percent (10%) deviation.

Time interval 256 is determined by subtracting the time of entry signal C3 from time T2 which ends within deviation window W2. Time T2 is measured from the trailing edge of entry signal C2 to the trailing edge of entry signal C3. All the time intervals in this embodiment are determined in the same manner as time interval 254 and time interval 256. Times T1, T2, . . . , Tn may be utilized in an embodiment of the password, along with time intervals and deviation windows, as validation factors for a presented password attempt. Time Td is an arbitrary time delay 262 added when password software 132 sends an "access denied" signal or an "access allowed" signal to computer 106.

FIG. 2E depicts a time-line of a "time lockout" password 270 of the present invention. Initializing entry signal C1 signals password software 132 that a password attempt is being presented. The interval timer is reset and started at time A1. Time T1 272 is measured from the trailing edge of entry signal C1. Time T1 272 acts as a "time lockout" so that no other character entries will be considered by password software 132 before the interval timer, which began timing at time A1 completes time interval 272. Any entry signal attempts from computer 106 will be answered with an arbitrary time delay Td (not shown) and an "access denied" signal sent to computer 106. Furthermore, time T1 must be complete (i.e., timed lockout ends within deviation window W1) before another entry event will be considered by password software 132. For example, a user may want to secure his computer overnight. In the process of activating the overnight password, the computer prompts the user for the password character(s) and the length of the desired lockout time T1. After the lockout time T1 has elapsed, password software 132 will then consider password entry attempts. Even so, the correct password, in this example entry event C2, must be entered to permit access to computer 100.

Each of the time intervals in a password can be any user-determined period of time. Further, the identity of the additional characters can (and should) be different from one another. A user can select time intervals and entry signals for inclusion in a password. Table 1 provides more detailed information concerning time intervals and entry signals for the time-line of password 250 shown in FIG. 2D.

TABLE 1

| Time interval | Entry event | Entry event time | Time T | Deviation |
|---|---|---|---|---|
| | C1 | | | |
| 999 ms (254) | C2 | 1 ms | 1000 ms | 900 ms < W1 < 1100 ms |
| 498 ms (256) | C3 | 2 ms | 500 ms | 450 ms < W2 < 550 ms |
| . . . | . . . | . . . | . . . | . . . |
| n ms (258) | Cn | 3 ms | (n + 3) ms | n ± 0.1 (n + 3) ms |

Table 1 indicates that password software 132 would read the first two segments in a maximum time of 1650 milliseconds (ms) Any additional time intervals and entry events add to the time of the time envelope. However, this does not include the variable and arbitrary time delay Td to disguise the actual length of time of the password.

The following password format is a literal representation of one embodiment of the password algorithm:

$$C1@A1+C2@A2+C3@A3+\ldots+Cn@An+Td \qquad (1)$$

where "C1" is a password initiating entry signal (or entry event); "A1" is the point that the interval timer is reset and begins timing; "A2, A3 . . . and An" are the timing points for subsequent entry events and time intervals; "C2, C3, etc.," are individual entry events that can comprise one or more computer readable signals which include characters, numbers, symbols, etc.; "Cn" is the "nth" entry event; and "Td" is a variable time delay that password software 132 waits after determining whether a password attempt is acceptable to disguise the true time of the stored password when allowing or denying entry.

As discussed previously, one of the most common schemes used by hackers is a so-called "dictionary" attack. A dictionary attack provides multiple combinations of entry events, but requires continual confirmation from the computer system under attack to confirm any correct entries. A powerful feature of the present invention requires that the hacker wait until the entire password attempt is entered before determining whether the password attempt is correct. By restricting the confirmation of a successful password attempt until the password attempt is complete in real time, the present invention prevents a hacker from determining whether progress is being made. Effectively, the hacker has to wait for the entry of a complete password attempt which may require a time of several microseconds, or eight hours, or many days.

For example, if an authorized user selected a password that included multiple time entries and entry events that totaled ten (10) seconds, each password attempt would have to be exactly tem (10) seconds long. A hacker using computer 106 would only be permitted a password attempt once every ten (10) seconds. Even if the hacker was aware that a time based password was protecting computer 100 and presented time markers for verification, the password confirmation of the present invention includes a variable time delay, Td, that password software 132 adds before sending the message "access denied." This variable, and arbitrary, time delay is added to the password attempt and masks the true length of the stored password. The combinations could be virtually endless. A stored password could have a total time interval of eight hours or more. A stored password that might have a length of eight hours or more would discourage most hackers. Additionally, the arbitrary and variable time delay that password software 132 waits before responding to computer 106 provides a mask for the true time envelope of the stored password.

FIG. 3 depicts a high-level flow diagram illustrating the operation of an exemplary computer password protection system according to one advantageous embodiment of the present invention. The process steps are generally referred to with reference numeral 300. The process begins with a password being established and stored in computer 100, where computer 100 is subject to online entry, either authorized or unauthorized (process step 301). After the stored password is in place, an online entity (for purposes of this example, attacking computer 106) attempts to gain access to computer 100 via a modem or other communication interface device (process step 302). Protected computer 100 signals to the attacking computer 106 that a password is required (process step 304).

The attacking computer 106 transmits a password attempt in order to gain entry to the protected computer 100. Since the stored password of the present invention requires a complete password attempt before notifying attacking computer 106 of success or failure, a determination is made whether the time envelope (time measured from the first keystroke to the last keystroke) of a completely entered password attempt matches the stored password. After detecting an initial entry event (signal), the presented password attempt must be completely entered and submitted before any entry confirmation or denial is sent to attacking computer 106 (process step 306).

If the time envelope of the presented password attempt does not match the time envelope of the stored password for protected computer 100, the method of the present invention waits for an arbitrary time, time Td (process step 308) and access is denied to attacking computer 106 (process step 309). If the time envelope of the password attempt entered by attacking computer 106 matches the time envelope of the stored password, then protected computer 100 gets a first password segment (process step 310). Next, the method calculates the first time interval of the first segment (process step 311). If the first time interval (i.e., the time T1 minus the time of the entry event in the time segment) does not match the stored time interval of the first segment (process step 312), then the method of the present invention waits for an arbitrary time, time delay Td (process step 308) before notifying attacking computer 106 that access is denied (process step 309).

If the determination is made that the time interval of the first password segment of attacking computer 106 matches the time interval of the first segment of the stored password in computer 100, then the method of the present invention makes a determination of whether the entry event associated with the time interval matches the corresponding entry event of the stored password (process step 314). If there is no match, the method of the present invention waits for an arbitrary time, time delay Td (process step 308), and denies access to attacking computer 106 (process step 309). If there is a match, then the method of the present invention determines whether there are more password segments to be checked (process step 316). If there are more password segments, the method of the present invention then gets the next password segment (process step 311) and repeats the cycle of determining whether entry events and time intervals match (process steps 311–314).

If a determination is made in process step 316 that there are no more password segments (time interval and associated entry events) detected in the incoming password attempt, the incoming password attempt is deemed to present a valid password. The computer then waits an arbitrary period of time, Td, to mask the true length of the time envelope of the stored password (process step 318). The method of the present invention then grants access to protected computer 100 (process step 320).

The exemplary embodiments described above may be constructed from entries received from a computer keyboard. In other words, a user may design a stored password and password software 132 constructs the designed stored password. However, a stored password may be constructed automatically by utilizing a password software 132 that comprises a random character generator. Password software 132 can construct a stored password by inserting characters or signals for each entry event and by designating time intervals between the entry events. Thus, it is possible to generate a stored password that may be unknown to the password holder but is stored on a floppy disk (or other similar memory device). The password holder can use the password on a floppy disk to obtain access to computer 100. For remote access to computer 100, the holder of the stored password inserts the floppy disk into a remote computer 106. The floppy disk provides the stored password for remote entry access to protected computer 100. Even though storage of the stored password on a floppy disk may make computer 100 less secure, the stored password is useful if authorized access from a remote computer is required.

It is important to note that while the present invention has been described in the context of a fully functional computer system, those skilled in the art will appreciate that the instructions for practicing the method of the present invention are capable of being recorded on any type of a computer readable medium. The steps of the method of the present invention are executed, regardless of the particular type of signal bearing media actually utilized. Examples of computer readable media include: nonvolatile, hard-coded type media such as read only memories (ROMs) or erasable, electrically programmable read only memories (EEPROMs), recordable type media such as floppy disks, hard disk drives, solid state drives, flash memory and CD-ROMs, and transmission type media such as digital and analog communication links.

Although the present invention has been described in detail, those skilled in the art should understand that they can make various changes, substitutions and alterations herein without departing from the spirit and scope of the invention in its broadest form.

What is claimed is:

1. Computer-implementable instruction code operable on a user device for constructing and transmitting a password to an authentication device that authenticates the password and grants the user device access to protected information, said instruction code being operable for;
   receiving through an input device from a user, a sequence of predefined characters to be utilized to construct the password;
   retrieving from a memory, a time interval mutually agreed upon by the user device and the authentication device; and
   individually transmitting the characters to the authentication device separated in time by the mutually agreed upon time interval, and without regard to any timing characteristics with which the characters were received from the user.

2. In a user device, a computer-implemented method of constructing and transmitting a password to an authentication device that authenticates the password and grants the user device access to protected information, said method comprising:
   receiving through an input device from a user, a sequence of predefined characters to be utilized to construct the password;
   retrieving from a memory, a predefined time interval; and
   individually transmitting the characters to the authentication device separated in time by the predefined time interval.

3. The method of claim 2, wherein the password includes at least three characters, and wherein the step of retrieving a predefined time interval includes retrieving a first predefined time interval for separating a first pair of adjacent characters and retrieving a different second predefined time interval for separating a second pair of adjacent characters.

4. The method of claim 2, further comprising, before the retrieving step, the steps of:
   receiving at least one predefined time interval from the authentication device; and
   storing the at least one predefined time interval in the memory.

5. In an authentication device, a computer-implemented method of authenticating a user device requesting access to protected information through the authentication device, said method comprising:
   receiving at least two individually transmitted password characters from the user device;
   measuring a time of receipt for each received password character to determine a received time interval separating each password character from an adjacent password character received from the user device;
   determining by the authentication device, whether the received time interval separating each password character from an adjacent password character matches a predefined time interval;
   determining by the authentication device, whether the received password characters match a sequence of predefined characters; and
   positively authenticating the user device only if the received time interval separating each password character from an adjacent password character matches the predefined time interval, and the received password characters match the sequence of predefined characters.

6. A method of transmitting a computer password having a plurality of characters, comprising:
   obtaining at least one predefined time interval for defining individual transmission times for transmitting at least two password characters from a user device to an authentication device; and
   individually transmitting the at least two password characters from the user device to the authentication device at the individual transmission times for each password character;
   wherein a valid password must include the correct password characters, and the password characters must be received by the authentication device with the correct time interval between sequential password characters.

7. A computer-implemented method of authenticating a user device requesting access to protected information through an authentication device, said method comprising:
   in the user device:
      receiving through an input device from a user, a sequence of predefined characters to be utilized to construct the password;
      retrieving from a memory, a predefined time interval; and
      individually transmitting the password characters to the authentication device separated In time by the predefined time Interval; and
   in the authentication device:
      receiving the individually transmitted password characters from the user device;
      measuring a time of receipt for each received password character to determine a received time interval separating each password character from an adjacent password character in the password;
      determining by the authentication device, whether the received time interval separating each password character from an adjacent password character matches the predefined time interval;
      determining by the authentication device, whether the received password characters match the sequence of predefined characters; and
      positively authenticating the user device only if the received time interval separating each password character from an adjacent password character matches the predefined time interval, and the received password characters match the sequence of predefined characters.

* * * * *